United States Patent [19]

Schwarz et al.

[11] Patent Number: 4,464,619
[45] Date of Patent: Aug. 7, 1984

[54] CIRCUIT ARRANGEMENT FOR THE CONTROLLED SUPPLY TO A LOAD

[75] Inventors: Gerhard E. Schwarz, Altena; Günther Bergk, Raunheim, both of Fed. Rep. of Germany

[73] Assignee: Braun Aktiengesellschaft, Kronberg, Fed. Rep. of Germany

[21] Appl. No.: 338,297

[22] Filed: Jan. 11, 1982

[30] Foreign Application Priority Data

Feb. 5, 1981 [DE] Fed. Rep. of Germany ....... 3103863
Mar. 24, 1981 [DE] Fed. Rep. of Germany ....... 3111432
Nov. 9, 1981 [DE] Fed. Rep. of Germany ....... 3144486

[51] Int. Cl.$^3$ ............................................... H02J 7/04
[52] U.S. Cl. ........................................ 320/40; 320/48
[58] Field of Search ..................... 363/18, 19, 20, 21, 363/48; 320/39, 40, 48, DIG. 1; 331/112

[56] References Cited

U.S. PATENT DOCUMENTS

| 3,568,038 | 3/1971 | Enders et al. | |
|---|---|---|---|
| 4,005,351 | 1/1977 | Blum . | |
| 4,155,081 | 5/1979 | Haglund | 320/48 |
| 4,316,242 | 2/1982 | Colangelo et al. | 363/21 |
| 4,376,263 | 3/1983 | Pittroff et al. | 363/19 |

FOREIGN PATENT DOCUMENTS 2014377 10/1970 Fed. Rep. of Germany .
2751578 5/1978 Fed. Rep. of Germany .
2948054 4/1981 Fed. Rep. of Germany .

*Primary Examiner*—William M. Shoop
*Assistant Examiner*—Anita M. Ault
*Attorney, Agent, or Firm*—Robert A. Shack

[57] ABSTRACT

A supply circuit for supplying an electrical load with a relatively constant current from a variable voltage input source, the supply circuit including a blocking oscillator including a transformer with primary and secondary windings and a switching transistor, the load terminals of the switching transistor being connected in series with the primary winding across the voltage input source, a resistor-capacitor circuit connected between the secondary winding and a control terminal of the switching transistor, a diode connected between the secondary winding and a first terminal of the electrical load, a voltage feedback connection for applying to a first load terminal of the switching transistor a portion of the secondary winding voltage, and a reference voltage source connected to the control terminal of the switching transistor.

4 Claims, 5 Drawing Figures

CIRCUIT ARRANGEMENT FOR THE CONTROLLED SUPPLY TO A LOAD

The invention concerns a circuit arrangement for the controlled supply to a load from input voltage sources of different voltage, by using a b.o. type converter with a transformer, whose primary coil is connected to a terminal of the forward transmission path of a controllable semiconductor switch.

With portable electric and electronic devices, it is desirable that they can be operated at various voltages, or, if they have storage batteries, that these storage batteries can be charged at various voltages. For example, electric shavers, electronic flash units, portable radios, or the like are often taken along on journeys abroad and are then operated in the various countries with different line voltages. These line voltages generally vary on the one hand between 110 volts and 220 volts and on the other hand between 50 Hz and 60 Hz.

To adapt the small units, and specifically storage batteries, to the various voltages, one needs to transform the voltage, which can be done capacitatively or inductively.

A transistor converter circuit is already known, which can generate on the one hand a charging current for a storage battery and on the other hand a higher direct current for driving a motor (DE-OS No. 20 14 377, U.S. Pat. No. 3,568,038). This device has a high-frequency through-flow transformer with a saturable core, whose primary side is connected to the rectified line voltage and whose secondary side supplies the desired current. The known circuit can be operated only at a particular line voltage, and therefore does not automatically adapt itself to different voltages. Since the core of the transformer always reaches the saturation region, its efficiency is low, and there are thermal problems.

Furthermore, a circuit arrangement is known for the controlled supply to a load from input voltage sources of various voltages. This arrangement uses a b.o. type converter, whose primary coil is in series with a switching transistor and an emitter resistor (U.S. Pat. No. 4,005,351). A secondary coil here feeds the load and feedback is effected through another coil. Another transistor is connected to the base of the switching transistor. The voltage drop at the emitter resistor is applied through a diode to the base of the second transistor. The switch-on time of the switching transistor here depends strongly on the input voltage, i.e. the oscillation frequency of the b.o. type converter depends very strongly on the input voltage and becomes higher with increasing input voltage. To compensate this undesirable circumstance, relatively expensive control circuitry has been provided.

Another known circuit arrangement known from the DE-OS No. 2 949 421 accounts for the influence of the input voltages on the primary side directly, that is not through the detour via another control circuit and a time delay. This is done by adding another current component to the primary current that is flowing over the emitter resistor. Said current component corresponds to the input voltage, for example, is directly proportional to it. As the input voltage rises, the primary current is then shut off earlier, i.e. at a lower value, in such a fashion that the output power has a predetermined dependency on the input voltage, and in particular is dependent on it. A disadvantage of this circuit arrangement is that stabilization of the charge current is not very good. Furthermore, this circuit arrangement is sensitive to tolerances in the components. Furthermore, it is not stable with respect to idling and has no reserve for highly discharged NC cells.

Finally, from the DE-OS No. 2 751 578, another circuit arrangement is known, which uses the voltage drop across the emitter resistor in order to cut off when a particular primary current is reached. In addition, a control voltage is derived from another coil during the blocking phase of a converter. Said control voltage also influences the cut-off time, so that a certain characteristic curve is obtained. As the input voltage increases, the feedback becomes stronger, which counteracts the cut-off through the primary current. The subsequent control circuit therefore must additionally also compensate the larger feedback current.

The aim of the invention is to create a circuit arrangement for the controlled supply to a load from input voltage sources with differing voltages, which can use mass-produced components, which requires little technical effort in terms of circuitry, and which has good charge current stabilization without voltage switching even if the line voltages differ considerably from one another, which is not susceptible to negative effects from fluctuations of operating voltage and idling operation, and which heats up only slightly during operation.

According to the invention, this aim is achieved by the other terminal of the forward transmission path of the controllable semiconductor switch having applied to it a portion of the voltage existing at the secondary coil of the transformer.

The advantage of the solution according to the invention consists in the following: An electrical load can be operated without voltage switching being required, at line voltages which differ considerably from one another, for example 110 volts and 220 volts a.c. as well as d.c. Here, the electrical load can consist either of an energy storage medium in the form of a storage battery or, for example, of a d.c. motor, so that a corresponding device, for example, an electric shaver, can also be operated independent of the line.

The circuit arrangement required for this is characterized by the use of mass-produced components and by the use of only a small number of such components, so that the technical effort in terms of circuitry is only small. Furthermore, the circuit arrangement according to the invention has good charge current stabilization and exhibits no negative effects even during rather severe fluctuations of operating voltage.

One embodiment of the inventive solution is characterized by the other terminal of the forward transmission path of the controllable semiconductor switch being connected with a tap of the secondary coil of the transformer.

This embodiment of the inventive solution has not only the above-mentioned advantages, but also the advantage that it is very stable with respect to idling, the individual components heat up only slightly during operation, and it has sufficient switching reserve for extreme loads involving highly discharged storage batteries, especially nickel-cadmium cells, even without requiring special efforts in terms of the components utilized.

A further embodiment of the inventive solution is characterized by the other terminal of the forward transmission path of the controllable semiconductor switch being connected, through a resistor, to one end of the secondary coil of the transformer.

This embodiment of the inventive solution is characterized by its retaining the above-mentioned advantages, but by the absence of a requirement for an additional tap at the coil of the transformer, a requirement which could be problematical for production reasons, but need not be problematical in all cases.

A further solution of the above-mentioned embodiments of the inventive solution consists in connecting the control electrode of the controllable semiconductor switch with a reference voltage source. The reference voltage source, for example, can be formed by a zener diode.

Another embodiment of the inventive solution is characterized by a first resistor having one terminal connected to the other terminal of the forward transmission path of the controllable semiconductor switch, while the other terminal of said resistor is connected to the terminal of the secondary coil of the transformer and to a terminal of a second resistor, whose other terminal is connected to a pole of a battery.

Besides the advantages mentioned above, this embodiment also has very good control characteristics and guarantees that, even at large operating voltage fluctuations of 90 to 250 volts, the changes of charge current lie only in the order of a milliamp.

One embodiment of the solution is characterized by a resistor and two diodes, connected in the same direction, being connected in parallel with the secondary coil of the transformer, where one of said diodes is a light emitting diode and is used as an operation indicator.

The basic idea of the invention will be explained in more detail by means of the embodiments shown in the drawing. The following are shown:

Figure 1:
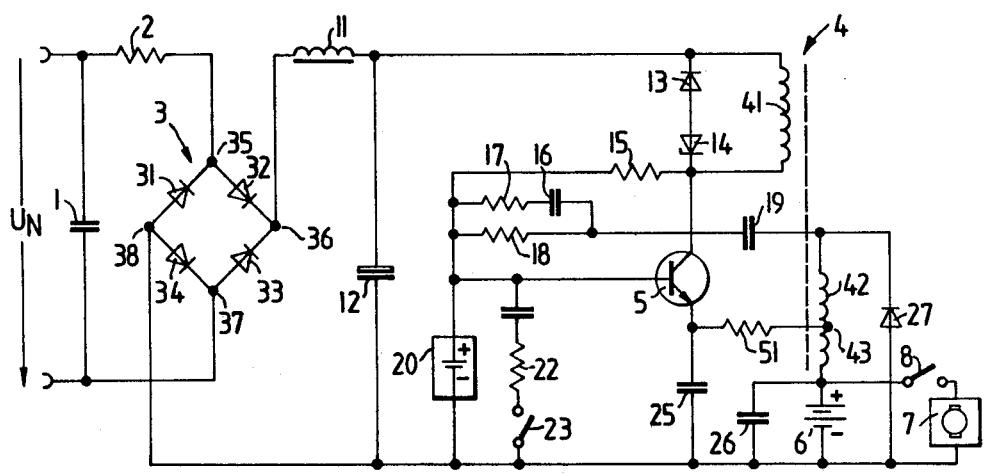
FIG. 1 shows a first embodiment with an electronic switch, one of whose load terminals is connected to a tap of the transformer, and whose control terminal is connected with a reference voltage source.

The embodiment shown in FIG. 1 shows a capacitor 1, connected in parallel with a line voltage source $U_N$ as well as a rectifying bridge circuit 3 with four diodes, 31, 32, 33, 34, which is likewise connected in parallel with the line voltage source $U_N$, via a resistor 2, by means of its a.c. terminals 35, 37. The d.c. terminals 36, 38 of this rectifying bridge circuit 3 are connected to a series inductance 11 and respectively to a parallel capacitor 12.

The cathode of a diode 13 is connected to the connection point between the inductance 11 and the capacitor 12. The anode of said diode is connected to the anode of a zener diode 14. The primary coil 41 of a transformer 4 is connected in parallel with the series circuit comprising the diodes 13 and the zener diode 14. The secondary coil 42 of the transformer 4 has one of its ends connected to a capacitor 19 and has its other end connected to a battery 6. A capacitor 26 is connected in parallel with the battery 6. Here, the connection point between the battery 6, the capacitor 26, and the secondary coil 42 is connected to a switch 8, which can connect a load 7, for example a d.c. motor or the like, in parallel with the battery 6.

The anode of a diode 27 is connected with the connection point between the battery 6 and the load 7. The cathode of said diode 27 is connected to the connection point between the capacitor 19 and the secondary coil 42. The connection point between the cathode, the zener diode 14, and the primary coil 41 is connected to the collector of a transistor 5, whose emitter is connected to a resistor 21 and to a capacitor 25, and whose base is connected to the plus pole of a reference voltage source 20. A series circuit comprising a capacitor 21, a resistor 22, and a switch 23, is provided in parallel with the reference voltage source 20. Here, the capacitor 21 is connected to the base of the transistor 5, and the switch 23 is connected to the minus pole of the reference voltage source 20 and the capacitors 25, 26.

A parallel circuit comprising a resistor 18 in one branch and a resistor 17 as well as a capacitor 16 connected in series therewith in its other branch is connected between the base of the transistor 5 and the capacitor 19, which is connected to the secondary coil 42.

Furthermore, a resistor 15 is situated between the base of the collector of the transistor 5. The resistor 15 is connected to the primary coil of the transformer 4.

The resistor 51 is connected to the emitter of a transistor 5. It is also connected to a tap 43 of the secondary coil 42 of the transformer 4.

The mode of functioning of the circuit arrangement according to FIG. 1 will subsequently be explained in more detail in connection with the mode of functioning of the circuit arrangement according to FIG. 2, which will be explained below.

Figure 2:
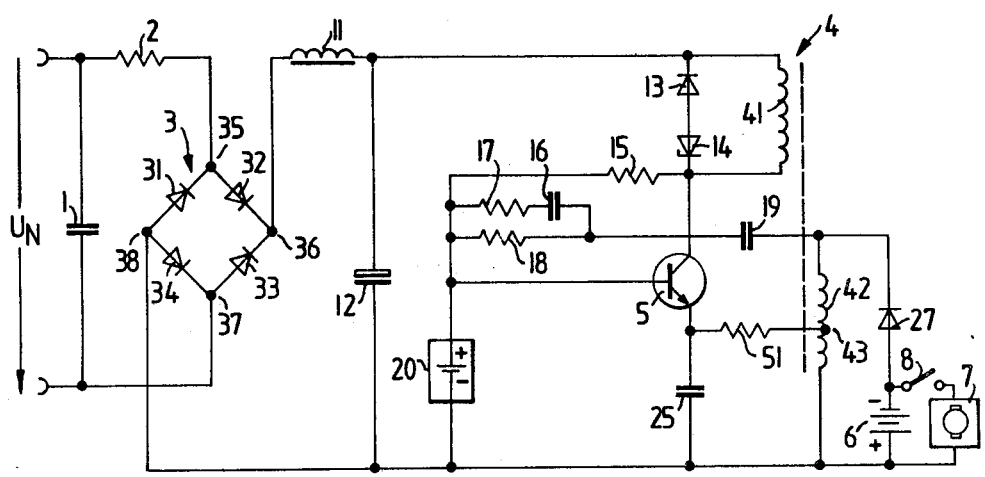
FIG. 2 shows a variant of the circuit arrangement according to FIG. 1, in which a battery, which plays the role of a load and which is to be charged up, has its positive terminal connected to the minus pole of a reference voltage source.

The circuit arrangement shown in FIG. 2 quite generally corresponds to the circuit arrangement according to FIG. 1. Here, the same reference numbers designate the same components, so that a detailed description of the circuit will be omitted below.

The circuit arrangement according to FIG. 2 differs from the circuit arrangement according to FIG. 1 essentially in virtue of the fact that the battery or the storage battery 6, which is optionally used as a load or as a voltage source, is connected in series with the diode 27. Here, the series circuit is in parallel with the secondary coil 42 of the transformer 4. Furthermore, the circuit arrangement according to FIG. 2 does not have the series circuit comprising the capacitor 21, the resistor 22, and the switch 23, connected in parallel with the reference voltage source 20, nor the capacitor 26, connected in parallel with the storage battery 6.

The circuit arrangement shown in FIGS. 1 and 2 can be used for various functions. When the switch 8 is open, they are used in charging circuits for the battery or for the storage battery 6. When the switch 8 is closed, they are used as a switching power supply for a load 7, which may, for example, be a d.c. motor or an electric shaver.

The mode of operation of the arrangement according to FIG. 1 is as follows: After the line voltage $U_N$, which can fluctuate within a wide range, has been subjected to interference-suppression by the capacitor 1, it is conducted through the limiting resistor 2 to the rectifier bridge circuit 3 and is there rectified. The rectified voltage is conducted through the series inductance 11 and the parallel capacitor 12 to the actual switching power supply.

The switching transistor 5, which is used as a controllable semiconductor switch, is made conducting through the primary coil 41 of the transformer 4 and through the resistor 15 which acts as a start-up aid, whereby the flyback voltages at the primary coil 41 are limited by the diode 13 and the zener diode 14.

The base connection of the switching transistor 5 is maintained at a particular voltage potential by a suitable reference voltage source, e.g. a zener diode or the voltage source 20.

An essential point for the invention now is that the emitter of the switching transistor 5 is connected to the plus pole of the battery 6, through the resistor 51 and a portion of the secondary coil 42. Here, the minus pole of said battery 6 is at ground potential.

In the conducting phase of the switching transistor 5, a voltage rise occurs at the point 43 of the secondary coil 42, where said voltage rise is proportional to the operating voltage $U_N$. After the switching transistor 5 switches through, a current flows through the primary coil 41, the collector-emitter line of transistor 5, the resistor 51 and the lower portion of the secondary coil 43, into the battery 6. Consequently, this current is reduced because of the potential rise at the tapping point 43. The current is here reduced to an extent such that, as the operating voltage $U_N$ varies, the power delivered on the secondary side remains constant. The time intervals, during which the voltage at the capacitor 19 is switched through by the switching transistor 5, therefore are not influenced only by the external circuitry of the transistor 5, but also by the voltage at the capacitor 19 and thus by the input voltage $U_N$, because a portion of this voltage is applied to the tapping point 43. At the same time, this voltage influences the current flowing into the battery 6, because only such a current can flow from the emitter of transistor 5 into the battery 6 as corresponds to the voltage difference between the battery 6 and the emitter of transistor 5 or respectively the resistance of the resistor 51 and the lower portion of the secondary coil 43.

The regulation of the load voltage is determined from the following equation:

$$I_{51} = (U_{20} - U_{BE(5)} - U_{43} - U_6)/R_{51}$$

In this equation, $I_{51}$ designates the current flowing through the resistor 51, $U_{20}$ designates the voltage of the reference voltage source 20, $U_{BE(5)}$ designates the base-emitter voltage of the switching transistor 5, $U_{43}$ designates the voltage at the lower section of the secondary coil 42 between the tap 43 and the terminal of the battery 6, $U_6$ designates the voltage of the battery 6, and $R_{51}$ designates the resistance of the resistor 51.

The regulation of the load voltage and respectively of the current* flowing through the resistor 51, which is connected to the transformer tap 43 and to the emitter of the switching transistor 5, is determined from the following equation:

$$I_{51} = (U_{20} - U_{BE(5)} - U_{43})/R_{51}$$

Here, $I_{51}$ likewise represents the current flowing through the resistor 51, while $U_{20}$ designates the voltage delivered by the reference voltage source 20, $U_{BE(5)}$ designates the base-emitter voltage of the switching transistor 5, $U_{43}$ designates the voltage of the secondary coil 42 of the transformer 4, and $R_{51}$ designates the resistance of the resistor 51.

*In the German, the words "current flowing through the" are omitted, and have been added in the translation to complete the sense.

The battery 6 is located in the emitter circuit of the switching transistor 5, and is used to feed a load 7. It yields the advantage that, as the battery voltage rises—for example if the battery 6 is fully charged—the emitter current is likewise lowered, i.e. the load current flowing in the battery 6 is reduced. Increasing the secondary load current or lowering the voltage in the battery 6 causes an increase of the secondary power delivered through the transformer 4. Naturally, the battery 6 can also be replaced by a larger capacitor, e.g. the capacitor 26.

If a change of the battery voltage is not to have an effect on the delivered secondary power, the base point of the reference voltage source 20 can be connected to the plus pole of the battery 6.

The secondary coil 42 is also used as a feedback coil, which actuates the base of the switching transistor 5 through the capacitor 19 and the resistor 18. During the blocking phase of transistor 5, the capacitor 19 and the resistor 18 are used to clear out more quickly the charge carriers in the base of said transistor 5.

The capacitor 25 blocks parasitic oscillations, while the capacitor 26, according to FIG. 1, takes care of a better shunting of the switching frequency from the plus pole of battery 6 to ground.

By means of the resistor 22 and the capacitor 21 according to FIG. 1, it is possible, by means of the switch 23, to switch over from fast charge to a small maintenance current.

The resistor 22 is here used only for decoupling. The capacitor 21, together with the capacitor 19, here forms a capacitive voltage divider upon completion of the transformer discharge phase, so that the capacitor 19 begins to charge up through the resistor 15 at a low voltage potential. The time- and voltage-difference from the beginning of the charging process of the capacitor 19 until the point is reached when the transistor 25 switches on again ($U_{ON} = U_{BATT} + U_{BE}$) is thereby increased.

In the circuit arrangement according to FIG. 2, the plus pole of the battery 6 is not situated in the emitter circuit of the switching transistor 5 but is grounded. If the line voltage $U_N$ changes, however, the circuit arrangement behaves in principle just like the circuit arrangement according to FIG. 1.

Figure 3:
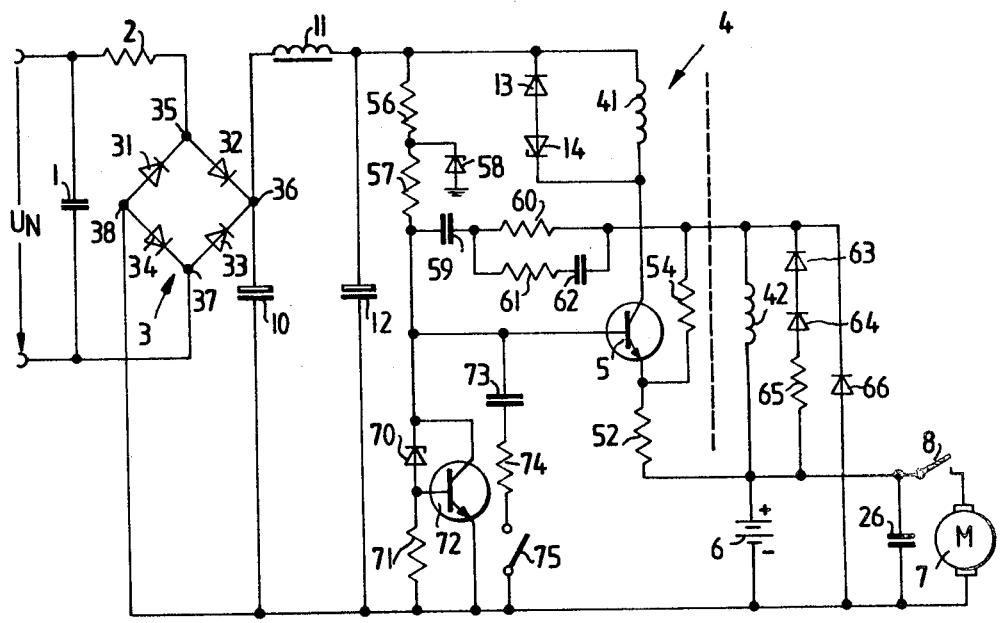
FIG. 3 shows a second embodiment with a controllable semiconductor switch which is connected, through a resistor, to the secondary coil of the transformer.

The second embodiment, shown in FIG. 3, likewise shows a capacitor 1 in parallel with the terminals of a line voltage source $U_N$ as well as a rectifier bridge 3, in series with a resistor 2. The bridge diagonals 35 are connected to the resistor 2, and the bridge diagonals 37 are connected to the other terminal of the line voltage source $U_N$. The rectifier-bridge circuit 3 has four diodes 31, 32, 33, 34, in a fashion that is in itself well known.

A smoothing capacitor 10 and respectively a smoothing inductor 11, connected in parallel, are connected with the other bridge diagonals 36, 38. The series circuit of the smoothing capacitor 11 together with the smoothing inductor 11 has another capacitor 12 connected in parallel with it. The series circuit comprising a first resistor 71 with a zener diode 70 as well two further resistors 56, 57 is connected in parallel with said capacitor 12. While the anode of the zener diode 70 is connected to the base of a transistor 72, the cathode of the diode is connected to a capacitor 59, which is connected in series with a parallel circuit whose first branch contains a resistor 60 and whose second branch contains a series circuit comprising another resistor 61 and a capacitor 62.

The entire parallel circuit is connected to a resistor 54 which on its part is connected to the emitter of the transistor 5. This emitter is also connected to a resistor 52, which in turn is connected to the positive pole of a battery 6. A capacitor 26 and a d.c. motor 7 are connected in parallel with this battery 22. The connection point between the resistor 52, on the one hand, and the battery 6, the capacitor 26, and the d.c. motor 7, on the other hand, is connected to a resistor 65, which is connected in series with two diodes 63, 64, that are poled in the same sense. This series circuit is connected in parallel with the secondary coil 42 of a transformer 4, whose primary coil 41 is connected on the one hand to the collector of the transistor 5 and on the other hand to the inductor 11. A diode 13 and a zener diode 14, connected in series therewith but poled in the opposite sense, are both connected in parallel with the primary coil 41. The cathode of the diode 13 and the cathode of the zener diode 14 both are connected to one end of the primary coil 41. The base of the transistor 5 can be connected through a capacitor 73, a resistor 74, and a switch 75, to the negative pole of the battery 6. This negative pole of the battery 6 is also connected through a diode 66, to the cathode of the diode 64, which advantageously is designed as a light emitting diode.

To improve the mode of operation of the circuit arrangement according to FIG. 1, a transistor and a resistor 44 can also be connected to the zener diode 15. In this way, the zener voltage is made more precise in well-known fashion.

Furthermore, a resistor 42 and a zener diode 46 can be supplied, so as to charge up the capacitor 40, through the resistor 42, from a constant voltage potential.

An electric load 7, in the form of a d.c. motor, is connected in parallel with the battery 6, through a switch 8. This d.c. motor 7 thus can selectively be supplied directly from the above described circuit arrangement or from the battery 6.

Figure 4:
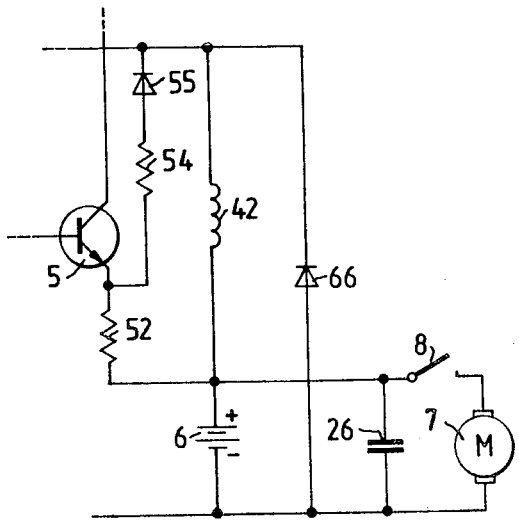
FIG. 4 shows a variant of the circuit arrangement according to FIG. 3.

FIG. 4 shows a circuit arrangement which represents part of the circuit arrangement according to FIG. 3, where a few changes have been made in this part. In place of the two diodes 63, 64 and the resistor 65 in FIG. 3, FIG. 4 provides only for a light emitting diode 55 preceding the resistor 54.

The circuit arrangements shown in FIGS. 3 and 4 can be used for various functions. When the switch 8 is open and the switch 75 is closed, they can be used as charging circuits for the battery 6. On the other hand, when the switch 8 is closed they can be used as a switched power supply for the load 7, which can be, for example, a d.c. motor of an electric shaver.

The mode of operation of the circuit arrangement according to FIG. 3 is as follows:

After the line voltage $U_N$, which can fluctuate within wide limits, has been freed from interference by the smoothing capacitor 1, it is conducted through the limiting resistor 2 to the rectifier 3 and is there rectified. The rectified voltage is now conducted through the inductance 11 and the capacitor 13 to reach the actual switched power supply.

The transistor 5 is made conducting through the primary coil 41 and through the resistor 56, which is used for build-up. Here, the fly-back voltage at the primary coil 41 is limited by the diode 13 and by the oppositely poled zener diode 14.

The base connection of the transistor 5 is maintained at a fixed voltage potential through a zener diode 70 which is used as a reference voltage source.

An essential point for the invention now is that the emitter of the switching transistor 5 is connected through the resistor 54 to a terminal of the secondary coil 42, and through the resistor 52 to the plus pole of the battery 6.

In the conducting phase of the transistor 5 a voltage rise proportional to the line voltage $U_N$ occurs at the connection point between the resistor 54 and the secondary coil 42. After the transistor 5 switches through, a current flows through the primary coil 41 and through the collector-emitter line of the transistor 5, through the resistor 52, and into the battery 6. Consequently, this current will be reduced because of the potential rise at the connection point between the resistor 54 and the secondary coil 42. The current is here reduced to such an extent that, as the operating voltage $U_N$ varies, the power delivered on the secondary side is held constant.

The time segments, during which the voltage existing at the capacitor 12 is switched through by the transistor 5, thus are influenced not only by the external circuitry of the transistor 5 but also by the voltage at the capacitor 12 and consequently by the line voltage $U_N$, because a portion of this voltage is present at the connection point between the resistor 54 and the secondary coil 42. At the same time, this voltage influences the current flowing into the battery 6 because only such a current can flow from the emitter of the transistor 5 into the battery 6 as corresponds to the voltage difference between the battery 6 and the emitter or respectively the resistance of the resistor 52.

The voltage regulation in the circuit arrangement according to FIG. 1 can be represented computationally by the current flowing in the emitter resistor 52:

$$I_{52}=(U_{70}-U_{BE5}-U_{BATT6})/R_{52}$$

where $I_{52}$ represents the current flowing through the resistor 52, $U_{70}$ represents the reference voltage at the zener diode 70, $U_{BE5}$ represents the base-emitter voltage drop at the switching transistor 5, $U_{BATT6}$ represents the voltage of the battery 6 and $R_{52}$ represents the resistance of the emitter-resistor 52.

The battery 6 is situated in the emitter circuit of the transistor 5. It is used to supply the load 7. Its advantage is that, as the battery voltage rises—for example when the battery 6 is still charged—the emitter current is simultaneously reduced, i.e. the charge current flowing into the battery 6 is reduced. An increase of the secondary charge current or respectively the lowering of the voltage of the battery 6 causes an increase of the secondary power delivered through the transformer 4. Naturally, the battery 6 can also be replaced by a larger capacitor, e.g. the capacitor 26.

If a change in the battery voltage is not supposed to affect the secondary power delivered, the base point of the reference voltage source 70 can be connected to the plus pole of the battery 6.

The secondary coil 42 is also used as a feedback coil, which actuates the base of the transistor 5 through the network 59, 60, 61, 62. The capacitor 26 takes care of a better shunting of the switching frequency from the plus pole of the battery 6 to ground.

By means of the resistor 74 and the capacitor 73, and through the switch 75, it is possible to change over from fast charging to a small maintenance current. The resistor 74 here serves only for decoupling. The capacitor 73, together with the capacitor 59 of the network, forms a capacitive voltage divider upon completion of the transformer discharge so that the charge-up process of the capacitor 59 through the resistor 56, 57 already begins at a low voltage. The time and voltage difference from the beginning of the charge-up process of the capacitor 59 until the point is reached when the transistor 5 switches on again ($U_{ON} = U_{BATT} + U_{BE}$) is thereby increased.

The light emitting diode 63 lights up during the charging phase of the battery 6, i.e. when a voltage is present at the secondary coil 42. The resistor 65 here acts as a current limiter.

FIG. 4 shows a circuit arrangement in which the light emitting diode 55 is connected in series with a resistor 54. Here, the resistor 54 takes over the function of a current limiter.

Figure 5:
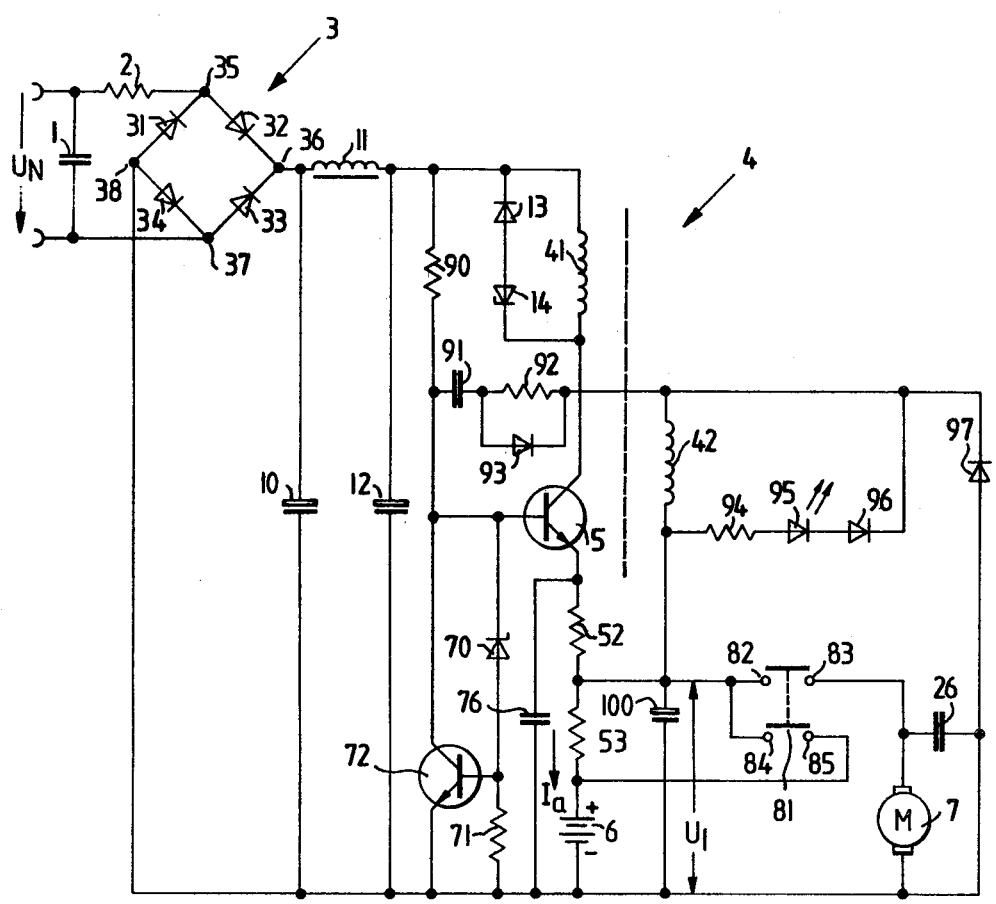
FIG. 5 shows a third embodiment with another resistor, connected in series with the above-mentioned resistor and with a battery that is being charged.

The embodiment shown in FIG. 5 shows a circuit arrangement, in which the capacitor 1 is connected in parallel with the line voltage $U_N$. One terminal of the capacitor 1 is connected directly to a point 37 of a rectifier bridge 3, and the other terminal is connected through a resistor 2, to a point 35 of the rectifier bridge 3. The rectifier bridge 3 has four diodes 31, 32, 33, 34, in a fashion that is in itself well-known. An inductance 11 is connected with the point 36 of the rectifier bridge 3, while the capacitors 10, 12 are connected with the point 38 of the rectifier bridge 3. These capacitors 10, 12 are connected to the inductance 11. A resistor 90 and a collector-emitter line of a transistor 72 are connected in parallel with the capacitor 12. Here, the collector of said resistor 72 is connected to the base of another transistor 5. A diode 70 and a resistor 71 are connected in parallel with the collector-emitter line of the transistor 72. Here, the anode of the zener diode 70 is connected to the base of the transistor 72, and the cathode of the diode 70 is connected to the base of the transistor 5.

The collector of the transistor 5 is connected to the primary coil 41 of a transformer 4, which on its part is connected to the inductance 11. Two oppositely connected diodes 13, 14 are situated in parallel with the primary coil 41. Of these diodes, diode 13 is a zener diode. The emitter of the transistor 5 is connected to a capacitor 76. One end of said capacitor 76 is connected to the negative pole of a voltage source 6 and the other end is connected to a resistor 52. On its part, said resistor 52 is connected to another transistor 53, which in turn is connected to a positive pole of a voltage source 6.

The connecting line between the two resistors 52, 53 is connected both to a terminal of a secondary coil 42 of the transformer 4 and also to a terminal of a capacitor 100. Here, the latter has one of the terminals connected to the negative pole of the voltage source 6.

A series circuit comprising a resistor 94 and two diodes 95, 96 is connected in parallel with the secondary coil 42 of the transformer 4. The cathode of the second diode 96, just like the second terminal of the secondary coil 42, is here connected to one end of a parallel circuit comprising a resistor 92 and a diode 93. This parallel circuit is connected, through a capacitor 91, to the connection line between the resistor 90 and the collector of the transistor 72.

The connection point between the resistors 52, 53, 94 and the capacitor 100 and respectively the secondary coil 42 is connected to two switch contacts 82, 84, which can be connected, through a double switch, to two other switch contacts 83, 85. The switch contact 85 is connected to the positive pole of the battery 6 while the switch contact 86 is connected to the terminal of the d.c. motor 7. The second terminal of the d.c. motor 7 is connected to the negative pole of the battery 6. A capacitor 26 is connected in parallel with the two terminals of the d.c. motor 7. One terminal of the capacitor 26 is connected to the switch contact 83, and its other terminal is connected to the anode of a diode 97. The cathode of this diode 97 is connected to the secondary coil 42 or respectively to the cathode of the diode 96.

The circuit arrangement shown in FIG. 5 differs from the circuit arrangement that have previously been shown and explained by its different mode of operation during the charging process. This charging process is shown in the figure, since the d.c. motor 7 is isolated from the power source through the switch 81. The transformed line voltage $U_N$ is thus used exclusively to charge the battery 6. When the motor is operated, the motor 7 is connected in parallel with the voltage source 6.

The different mode of operation of this embodiment is achieved by the series connection of the resistor 52 and the resistor 53. Here, the connection point between these two resistors 52, 53 is grounded through the capacitor 100. A terminal of the secondary coil 42 is also connected to this connection point. This is very important for the mode of functioning of the invention.

In this circuit arrangement, the current flowing through the secondary coil 42, generates a voltage at the abovementioned connection point. This voltage influences the peak current of the primary coil 41 of the transformer 4, i.e. the output quantity of the transformer 4 is fed back to the input. A closed control circuit therefore results.

In particular, the following holds:

$$J_B = (U_1 - U_B)/R_{26}$$

where $J_B$ is the current flowing to the battery 6, $U_1$ is the voltage existing at the series circuit which comprises the resistor 53 and the battery 6, $U_B$ is the battery voltage, and $R_{26}$ is the resistance of the resistor 26.

Furthermore, the following holds:

$$U_1 = U_Z + U_{BE72} - U_{BE5}((J_B + J_{LED95})R_{52})/2Ü$$

Here, $U_Z$ is the voltage drop at the zener diode 70, $U_{BE72}$ is the base-emitter voltage of the transistor 72, and $U_{BE5}$ is the base-emitter voltage of the transistor 5. $J_B$ again designates the battery current, and $J_{LED95}$ is the current flowing through a light emitting diode 95, and specifically the average value of this current. The transmission factor i.e. the transformer ratio of the primary coil 41 to the secondary coil 42 of the transformer 4, is designated by Ü, while $R_{52}$ specifies the resistance of the resistor 52.

From this, one calculates the voltage at the resistor 52 in the following fashion:

$$U_{R25} = (J_B + J_{LED95})/2Ü$$

The voltage drop at the resistor 52 is here small compared to the voltage drop at the resistor 53.

The switch-on and switch-off behavior of the transistor 5 is improved by the capacitor 76 and the diode 93.

The circuit arrangement shown in FIG. 5 can also be varied in a number of ways. For example, a light emitting diode can be connected between the emitter and the base of the transistor 5, and specifically its cathode can be connected to the base of the transistor 5. Furthermore, a diode can be connected in parallel with the collector-emitter line of the transistor 72. Here, its cathode is connected to the collector and its anode is connected to the emitter of the transistor 72. In such a variant, the light emitting diode, which is connected between the base and emitter of transistor 5 can be used as an operation indicator during charge operation. In this case, the diode 96 and the resistor 94 can be omitted. The above-mentioned light emitting diode would then light up when the motor operates and during charge operation and would simultaneously serve as a limiting diode for the negative base emitter voltage during the switch-off process of the transistor 5.

We claim:

1. A circuit for supplying an electrical load with a substantially constant current from an input voltage source of variable voltage, comprising:
 a blocking oscillator including a transformer having a primary winding and a secondary winding and a first transistor having first and second load terminals and a control terminal, said primary winding and said load terminals of said first transistor being connected in series across said voltage source;
 a resistor-capacitor circuit connected between said secondary winding and said control terminal of said first transistor;
 a reference voltage source connected to the control terminal of said first transistor;
 a first diode connected between said secondary winding and a first terminal of said electrical load; and
 voltage feedback means for applying to said first load terminal of said first transistor a portion of the voltage in said secondary winding.

2. A circuit according to claim 1, wherein said voltage feedback means comprises a tap provided on said secondary winding and a resistor connected between said secondary winding tap and said first load terminal of said first transistor.

3. A circuit as in claim 1, wherein said voltage feedback means comprises two resistors connected in series across said secondary winding, the junction of said resistors being connected to said first load terminal of said first transistor.

4. A circuit according to claim 1, wherein a first terminal of said secondary winding is connected with a second terminal of said electrical load and wherein a second terminal of said secondary winding is connected to said control terminal of said first transistor through a capacitor and a resistor-capacitor parallel circuit.

5. A circuit as in claim 1, further comprising a series circuit of a light-emitting diode, a second diode and a second resistor connected across said secondary winding.

6. A circuit according to claim 1, wherein said first load terminal of said first transistor is connected to one terminal of said secondary winding through a serial arrangement of a third resistor and a light-emitting diode, a cathode of said light-emitting diode being connected to said terminal of said secondary winding.

7. A circuit as in claim 1, further comprising a first additional resistor connected between said first load terminal of said first transistor and a terminal of said secondary winding and a second additional resistor connected between said first additional resistor and said first terminal of said electrical load.

8. A circuit according to claim 7, further comprising a capacitor connected between the junction of said first and second additional resistors and a second terminal of said electrical load.

9. A circuit as in claim 7, further comprising a series circuit of a second additional resistor, a light-emitting diode, and an additional diode connected in parallel to the terminals of said secondary winding, whereby said light-emitting diode serves as an operation indicator.

10. A circuit according to claim 7, further comprising a second transistor having a collector terminal connected to said control terminal of said first transistor, an emitter terminal connected to a second terminal of said electrical load and a base terminal connected to the junction of a third additional resistor and a zener-diode, said third additional resistor and said zener-diode being connected in series between said control terminal of said first transistor, and second second terminal of said electrical load, with the cathode of said diode being connected directly to said control terminal of said first transistor.

11. A circuit as in claim 7, further comprising a capacitor connected in series with a parallel configuration of a fourth additional resistor and a diode between said control terminal of said first transistor and one terminal of said secondary coil, an anode of said diode being connected directly to said capacitor.

* * * * *